(12) United States Patent
Bertuzzi et al.

(10) Patent No.: US 12,416,542 B2
(45) Date of Patent: Sep. 16, 2025

(54) METHOD AND APPARATUS FOR TESTING THE TIGHTNESS OF A CONTAINER CLOSED BY A MEMBRANE

(71) Applicant: G.D S.P.A., Bologna (IT)

(72) Inventors: Ivanoe Bertuzzi, Bologna (IT); Claudia De Maria, Bologna (IT); Marco Ghini, Bologna (IT); Luca Cavazza, Bologna (IT); Stefano Sinigardi, Bologna (IT); Andrea Biondi, Bologna (IT)

(73) Assignee: G.D S.P.A., Bologna (IT)

( * ) Notice: Subject to any disclaimer, the term of this patent is extended or adjusted under 35 U.S.C. 154(b) by 300 days.

(21) Appl. No.: 18/326,479

(22) Filed: May 31, 2023

(65) Prior Publication Data

US 2023/0400376 A1    Dec. 14, 2023

(30) Foreign Application Priority Data

Jun. 10, 2022    (IT) .................. 102022000012308

(51) Int. Cl.
*G01M 3/32*    (2006.01)

(52) U.S. Cl.
CPC ........................ *G01M 3/3209* (2013.01)

(58) Field of Classification Search
CPC ........ G01M 3/3209; G01M 3/36; G01M 3/38
See application file for complete search history.

(56) References Cited

U.S. PATENT DOCUMENTS

| 4,922,746 A | 5/1990 | Hulsman et al. | |
| 4,955,226 A * | 9/1990 | Beaty | G01M 3/36 |
| | | | 73/49.3 |
| 7,107,823 B1 * | 9/2006 | Lovvorn | G01M 3/36 |
| | | | 73/49.3 |

FOREIGN PATENT DOCUMENTS

| EP | 3730915 A1 | 10/2020 |
| WO | 2019/035711 A1 | 2/2019 |

OTHER PUBLICATIONS

Italian Search Report and Written Opinion issued for Italian Application No. 102022000012308 filed on Jun. 10, 2022 on behalf of G.D S.P.A. Date of Completion: Jan. 26, 2023. 8 Pages. (Original + English).

* cited by examiner

*Primary Examiner* — David Z Huang
(74) *Attorney, Agent, or Firm* — Steinfl + Bruno LLP (57) ABSTRACT

A method and relative apparatus for testing the tightness of a container closed by a membrane are described. The method includes steps of: submitting the container to a deforming action to increase the pressure inside the container; submitting the membrane to an abutting action to counteract the deformation of the membrane caused by the deforming action; maintaining the action of abutting the membrane at the same time as the action of deforming the container for a set period of time; interrupting the action of abutting the membrane at the end of the period of time; detecting at least one parameter related to a membrane profile when the abutting action has ceased; and comparing the at least one parameter related to the membrane profile with a predefined threshold to verify whether the tightness of the container is to be classified as defective.

18 Claims, 4 Drawing Sheets

METHOD AND APPARATUS FOR TESTING THE TIGHTNESS OF A CONTAINER CLOSED BY A MEMBRANE

CROSS-REFERENCE TO RELATED APPLICATIONS

The present application claims priority to Italian patent application No. 102022000012308 filed on Jun. 10, 2022, which is incorporated herein by reference in its entirety. The present application is also related to Italian patent application No. 102022000012311 entitled "Apparatus and method for testing the tightness of containers closed by respective membranes", filed on 10 Jun. 2022 by the same Applicant, which is incorporated herein by reference in its entirety.

FIELD

The present disclosure refers to a method and to an apparatus for testing the tightness of a container closed by a membrane.

The present disclosure finds a preferred, although not exclusive, application in the field of the production of loose containers such as yoghurt pots, dessert pots, cups for pre-cooked foods, capsules of brewing products, for example coffee, the latter being a sector to which reference may subsequently be made without losing generality.

In the present context, the term "capsule" is therefore intended to refer to the product formed by the container provided with the closing membrane.

BACKGROUND

Typically, the containers pertaining to this technical field are products having the shape of a glass-like element, substantially inverted conical-truncated, or of equivalent shape, with the widest portion upwards where the opening of the container is provided, and typically made of polymeric materials.

In the process of making the capsules, after the step of filling the container, in which the brewing product is introduced into the container through the opening, the sealing of the container is carried out by applying a membrane, with the function of a closing lid, having a laminar structure, which is fixed to an edge of the container delimiting said opening.

With the sealing, typically performed by welding or gluing or by means of an operation that includes both, an airtight closure of the container is obtained that allows the content of the capsule, and the inert protective atmosphere that may be inserted inside it, to remain permanently separated from the external atmosphere, at least until the removal or the perforation of the closing membrane, i.e. the perforation of the container if provided during the use of the capsule.

Definitions

In this description as well as in the accompanying claims, some terms and expressions are deemed to have, unless otherwise expressly indicated, the meaning expressed in the following definitions.

The term "membrane" means a body with a thin-thickness sheet structure, intended to close an opening and susceptible to deformation as a result of variations in the internal or external pressure upon opening and that is acting on it.

By "membrane profile" is meant the course of the membrane with respect to a reference plane of the container, for example the plane defined by an edge of the container, in particular of the opening mouth of the container, to which the membrane is attached.

By "deformation of the membrane" is meant a variation in the shape of the membrane, wherein at least a part thereof is spaced from the reference plane of the container, and said distance, orthogonal to the reference plane, is at least a few millimetres.

A container is "tightly closed" when it is hermetically closed, i.e. without the possibility of any appreciable gas/air exchange between the inside and outside of the container itself.

SUMMARY

In capsule packaging processes, there is generally provided a step of testing the tightness of the container closed by the membrane, carried out after the step of filling and sealing the same. In fact, it is crucial to ensure the integrity of the tight closure of the capsule, in order to prevent contaminations or oxidation phenomena of the product contained in its inside or possible leaks of the content itself from the capsule. Defects that may compromise the airtight closure may for example originate from ruptures or tears of the container and/or of the closing membrane and/or from interruptions of the welding or gluing zone of the membrane to the container.

A known testing system provides for submitting the container to a deforming action by compression, for example by a localised squeezing, during a section of its handling path, along which an inspection station is located. A load sensor is provided in the inspection station and is positioned to come into contact with the membrane, during the transit of the container, so as to detect possible variations in the pressure inside the container acting on the membrane. These internal pressure variations, induced by the squeezing action, in fact tend to deform the membrane, for example by inducing a swelling of the membrane itself. Since the pressure inside the container varies in the presence of losses of tightness, by effect of the escape of the air from the container, based on the pressure variations detected by the inspection system, any losses of tightness can be recognized, in view of the possible reject of the container.

The Applicant could observe that the action of deforming the container, both in terms of extent and duration of application, is critical for the realization of an effective control system in detecting the losses of tightness of the container. On the one hand, in fact, the force with which the deformation is applied, which must not be destructive of the container, is proportionally related to the increase in the internal pressure, if referred to a tightly closed container, and this internal pressure is responsible for the deformation of the membrane. On the other hand, the time of application of the deforming force on the container, which must necessarily be compatible with the cycle times of the production line, is also a critical factor because it affects the amount of air that escapes from the container, in the presence of defects. In fact, the longer the application time of the deforming force, the greater the amount of air that escapes from the opening that characterizes the defect, and consequently the smaller the sizes of the openings that can be detected. This factor therefore becomes decisive for the identification of losses of tightness related to the presence of openings having extremely reduced sizes.

However, the Applicant has found that by operating in the testing mode described above, the classification of defects of the containers often does not take place in a precise manner. The Applicant has in fact observed that the deforming action applied to the container, within the usual operating conditions of the production line, often does not generate an overpressure sufficient to allow, in the times available for the application of the deformation, the air that is suitable for detecting defects generated by openings with rather reduced sizes to escape from the container.

It should be noted, by way of example only, that in the reference sector it may be required that the smallest equivalent hole diameter of the defect, above which the tightness is classified as defective, is of the order of magnitude of a few hundred microns, for example equal to 250 microns. For comparison, consider that a human hair can have a maximum diameter of about 100 microns.

The Applicant has also found that, while on the one hand it is true that the longer it is possible to extend the duration of application of the deforming action, the smaller are the sizes of the openings or holes characterizing the defect that can be detected, on the other hand it is equally true that the lengthening of the duration nevertheless involves an increase in the extension of the container handling path, and said extension, which is in turn related to the speed with which the container is driven, is necessarily submitted to the limits of the overall dimensions imposed by the layout of the production line.

The Applicant has therefore realized that, in order to be able to recognise losses of tightness in the container even in the case of defects caused by openings with rather reduced sizes, of the type described above, it is appropriate to increase the overpressure created inside the container, so as to make the air exit faster, during the time of application of the action of deforming the container. In this way, with the same time of application of the deforming action and size of the defect, a greater amount of air can escape from the container.

The Applicant has therefore perceived that such an increase in the internal overpressure can be obtained during the action of deforming the container by preventing the membrane from deforming freely under the action of deforming the container. In fact, counteracting the deformation of the membrane can induce a further increase in pressure inside the container.

Finally, the Applicant has found that submitting the container to a deforming action and submitting the membrane to an abutting action adapted to counteract the deformation of the membrane caused by the deforming action, maintaining said action of abutting the membrane at the same time as said action of deforming the container, could guarantee an appropriate increase in pressure inside the container, suitable for the detection of losses of tightness generated also by extremely small-sized openings, up to the order of magnitude mentioned above.

Therefore, in a first aspect thereof, the present disclosure is directed to a method for testing the tightness of a container closed by a membrane.

Preferably, the method comprises submitting the container to a deforming action.

Thanks to this deforming action, the pressure inside the container is increased up to at least a first pressure level when referred to the tightly closed container.

Preferably, the method comprises submitting the membrane to an abutting action.

Preferably, said abutting action is adapted to counteract the deformation of the membrane caused by said deforming action.

Thanks to this abutting action, the pressure inside the container is increased up to at least a second pressure level when referred to the tightly closed container.

Preferably, the method comprises maintaining said action of abutting the membrane at the same time as said action of deforming the container.

Preferably, the method comprises maintaining said action of abutting the membrane at the same time as said action of deforming the container for a set period of time.

Preferably, the method comprises interrupting said action of abutting the membrane at the end of said period of time.

Preferably, the method comprises detecting at least one parameter related to a membrane profile when said abutting action has ceased.

Preferably, the method comprises comparing said at least one parameter related to said membrane profile with a predefined threshold to verify whether the tightness of said container is to be classified as defective.

In a second aspect thereof, the present disclosure is directed to an apparatus for testing the tightness of a container closed by a membrane.

Preferably, the apparatus comprises at least one deforming device configured to exert a deforming action on the container. This deforming action is adapted to increase the pressure inside the container up to at least a first pressure level when referred to the tightly closed container.

Preferably, the apparatus comprises at least an abutting element of the membrane configured to counteract the deformation of the membrane caused by the deforming action. This abutting action is adapted to increase the pressure inside the container up to at least a second pressure level when referred to the tightly closed container.

Preferably, said abutting element comprises a surface intended to abut by contact said membrane.

Preferably, said surface of said abutting element has a concave shape facing the membrane. In this way the abutting action is exerted substantially uniformly on a membrane which, submitted to the deforming action, has a profile with a dome shape.

Alternatively, equally preferably, said surface of said abutting element has a convex shape facing the membrane. Thanks to the convex-shaped surface, the abutting action is exerted gradually starting from a point of the membrane, preferably the geometric centre of the membrane, and then affecting an increasingly larger area of the membrane itself submitted to the deforming action.

Preferably, said deforming device and said abutting element are arranged to act at the same time on said container for a set period of time.

Preferably, the apparatus comprises a detection unit configured to detect at least one parameter related to a membrane profile when the abutting action of said abutting element has ceased.

Preferably, the apparatus comprises a control unit configured to compare said at least one parameter related to said membrane profile with a predefined threshold to verify whether the tightness of said container is to be classified as defective.

Thanks to these characteristics, with the same duration of the time of application of the deforming force, the combined and simultaneous action of abutting the membrane allows to increase the internal overpressure and consequently the speed of the air that escapes from the container in the presence of defects, ensuring the possibility of letting amounts of air exit, also caused by defects with very reduced sizes, which are such as to have the defect recognized through analysis of the deformed membrane profile, once the action of abutting the membrane is released.

In at least one of the aforementioned aspects, the present disclosure may further have at least one of the preferred features set forth below.

Preferably, the action of deforming the container and the action of abutting the membrane are exerted on the container while the container is driven along a handling path.

In this way, the times required for the step of testing the tightness can be substantially taken up, at least in part, within the times required for the completion of the production cycle of the capsules.

In a preferred embodiment, the action of abutting the membrane is exerted before said period of time starts.

In this way it is avoided that the membrane is submitted to a violent deformation, which condition would occur if the abutting element were brought into abutment squeezing the membrane already deformed by the deforming action induced on the container. Furthermore, it is avoided that the container can escape from the deforming device, consisting for example of a pair of pressing members, under the action of deformation of the container, in the absence of abutment of the membrane, with the risk of an incorrect positioning of the container or of its escape from the retaining seat.

In a preferred embodiment, detecting the at least one parameter related to the membrane profile is performed while said container is still submitted to said deforming action, after the abutting action has ceased.

In this way, the recognition of the membrane profile assuming a dome shape (due to the swelling induced by the deforming action) is facilitated in the case of a tightly closed container. Furthermore, it is avoided that, in the presence of defects, the release of the deforming force on the container may trigger an air suction action inside the container.

In a preferred embodiment, the deforming action is interrupted after said period of time and detecting said at least one parameter related to the membrane profile is performed after the deforming action has ceased.

In the presence of very elastic and easily deformable membranes, it is possible that the detection of the profile can take place effectively and precisely when the action of deforming the container has ceased, in this case the verification times can be reduced, since the detection of the profile can be performed immediately at the end of said period of time, when both the abutting and deforming action have ceased.

Preferably, said deforming action comprises at least one localised squeezing of said container.

Preferably, said at least one squeezing includes two squeezing actions performed, substantially simultaneously, on diametrically opposite sides of said container.

In this way, the deforming action is induced on the container with a substantial symmetry, counteracting possible misaligned positionings that the container can assume.

In a preferred embodiment, said at least one parameter related to the membrane profile is determined by detecting the position of one or more points of the membrane profile.

In a preferred embodiment, said at least one parameter related to the membrane profile is determined by contactlessly detecting said membrane.

Thanks to this feature, the detection of the membrane profile is not sensitive to recognizable factors that influence the result in the use of sensors or probes that operate by contact with the membrane. The risk of possible jams of a mechanical nature in the contact between the container and the sensor is also avoided. The detection of the membrane profile contactlessly is also independent of the sizes of the container (which may vary according to the supplier), in particular of its height, as well as of its positioning between the pressing elements of the deforming device. This also allows to reduce or avoid the activities of calibration or adjustment of the apparatus related to the aforementioned aspects, with consequent time and cost savings.

Preferably, said contactless detection of the membrane is performed by means of an optical detection device.

In a preferred embodiment, the method comprises detecting the position of a set of points of the membrane profile with respect to a reference plane. Preferably, said reference plane is defined by points localised at an edge of the container to which the membrane is fixed.

In this way a so-called "normalization" of the detected positions is obtained as they refer to the reference plane, which is identified in each container, with the advantage that the detection of the profile is therefore independent of the positioning of the container, with respect to the detection device.

Preferably, said set of points comprises at least a first and a second end point located at said edge, said first and second end points identifying a reference line belonging to said reference plane, the position of the points of said set being detected with respect to said reference line.

Preferably, said first and second end points are located respectively on diametrically opposite parts of the membrane.

Preferably, said threshold comprises at least one threshold line coinciding with said reference line or extended parallel to and spaced from said reference line, and said at least one parameter identifies the position of the points of said set with respect to said reference line.

In a preferred embodiment, the apparatus according to the disclosure further comprises a transport device of the container.

Preferably, the transport device has a portion with straight extension. Equally preferably, the transport device has a portion with curvilinear extension.

Preferably, said at least one deforming device is mounted on the transport device of the container.

Preferably, said at least one deforming device comprises a pair of pressing elements between which the container may be positioned, said pressing elements being mounted in an articulated manner on respective supports to be oscillatable from and to an operating position in which they exert the action of deforming the container.

In a preferred embodiment, the apparatus comprises a device for controlling the oscillation movement of each pressing element, said control device comprising a cam mechanism including a cam-follower element rotatably supported on the pressing element and superficially coupled with a cam profile extended along an extension direction of the transport device.

Preferably, said at least one abutting element is mounted on a handling device provided with an active branch along which the abutting element exerts the abutting action on the membrane of the container.

Preferably, said at least one abutting element is provided with through holes configured to be positioned at the membrane of the container during the action of abutting the membrane.

This facilitates the expulsion of air from the container, possibly due to ruptures or tears of the membrane, even if the defects are present at the surface of the membrane abutted by the abutting element.

Preferably, said at least one abutting element has a surface intended to abut the membrane having surface amplitude less than a surface amplitude of the membrane.

Thanks to this feature, the escape of the air near the edge of the container, possibly due to defects or imperfections of the weld present in the fixing zone of the membrane with the edge, is not hindered or counteracted by the abutting element.

In a preferred embodiment, the apparatus comprises a plurality of deforming devices mounted on the transport device configured to transport a plurality of containers, a respective deforming device of said plurality being individually associated with a respective container of said plurality of containers.

In this way it is possible to apply a substantially uniform deforming force in each container, preventing the deforming actions applied to the plurality of containers from being able to mutually influence each other.

In a preferred embodiment, the apparatus comprises a plurality of deforming devices mounted on the transport device configured to transport a plurality of containers, a respective deforming device of said plurality being individually associated with a respective container of said plurality of containers, and comprising a plurality of abutting elements mounted on said handling device, each abutting element being individually associated with a respective container of said plurality of containers in exerting the action of abutting the corresponding container membrane of the container.

Preferably, said detection unit comprises at least one optical detection device for contactlessly measuring said membrane.

It should be specified that some steps of the method described above may be independent of the order of execution reported. In addition, some steps may be optional. In addition, some steps of the method may be performed repetitively, or they may be performed in series or in parallel with other steps of the method.

BRIEF DESCRIPTION OF THE DRAWINGS

The features and advantages of the present solution will become clearer from the detailed description of an embodiment thereof shown, by way of non-limiting example, with reference to the appended drawings in which.

DETAILED DESCRIPTION

Figure 1:
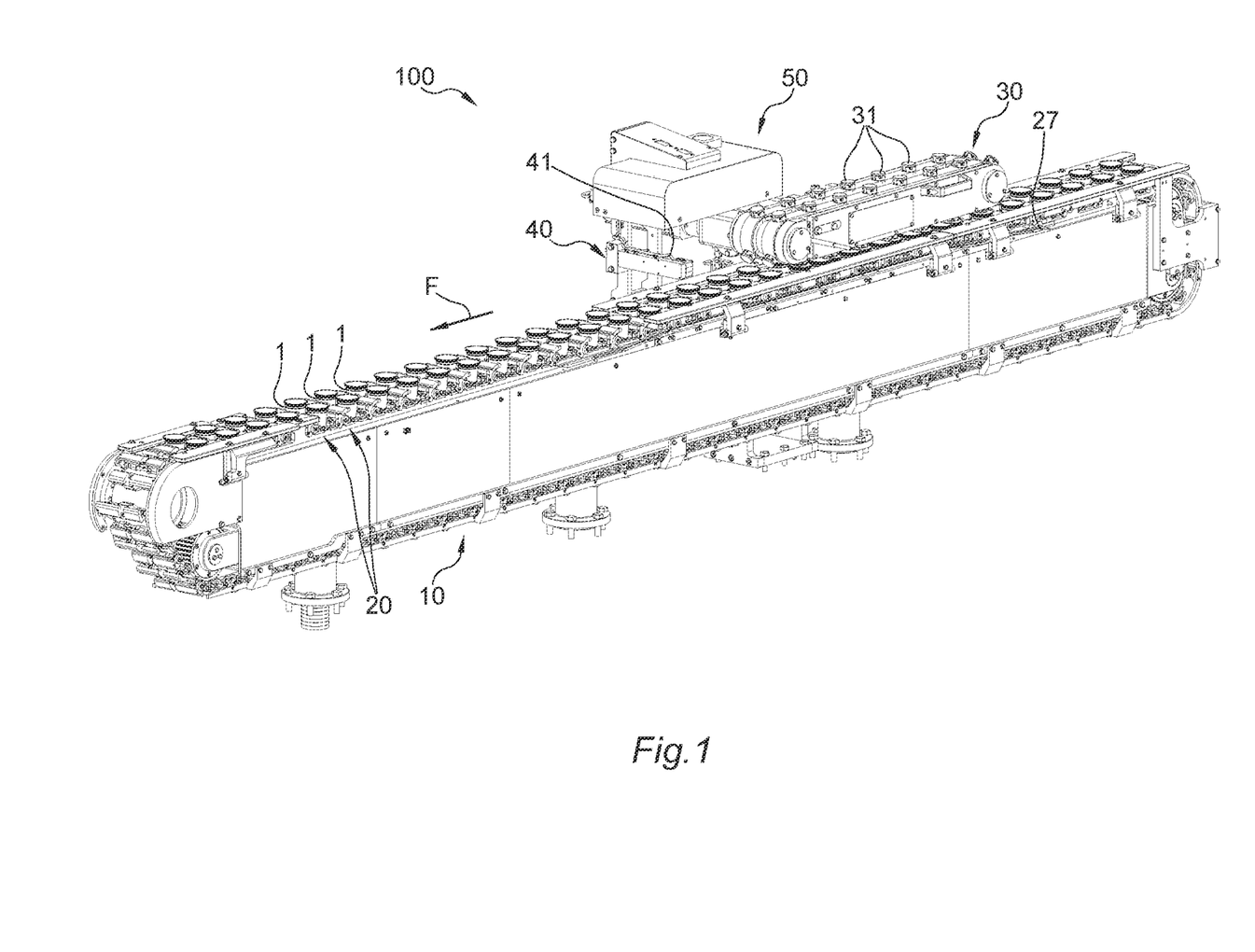
FIG. 1 is a schematic perspective view of an apparatus for testing the tightness of containers closed by a membrane, made in accordance with the present disclosure.
Figure 2:
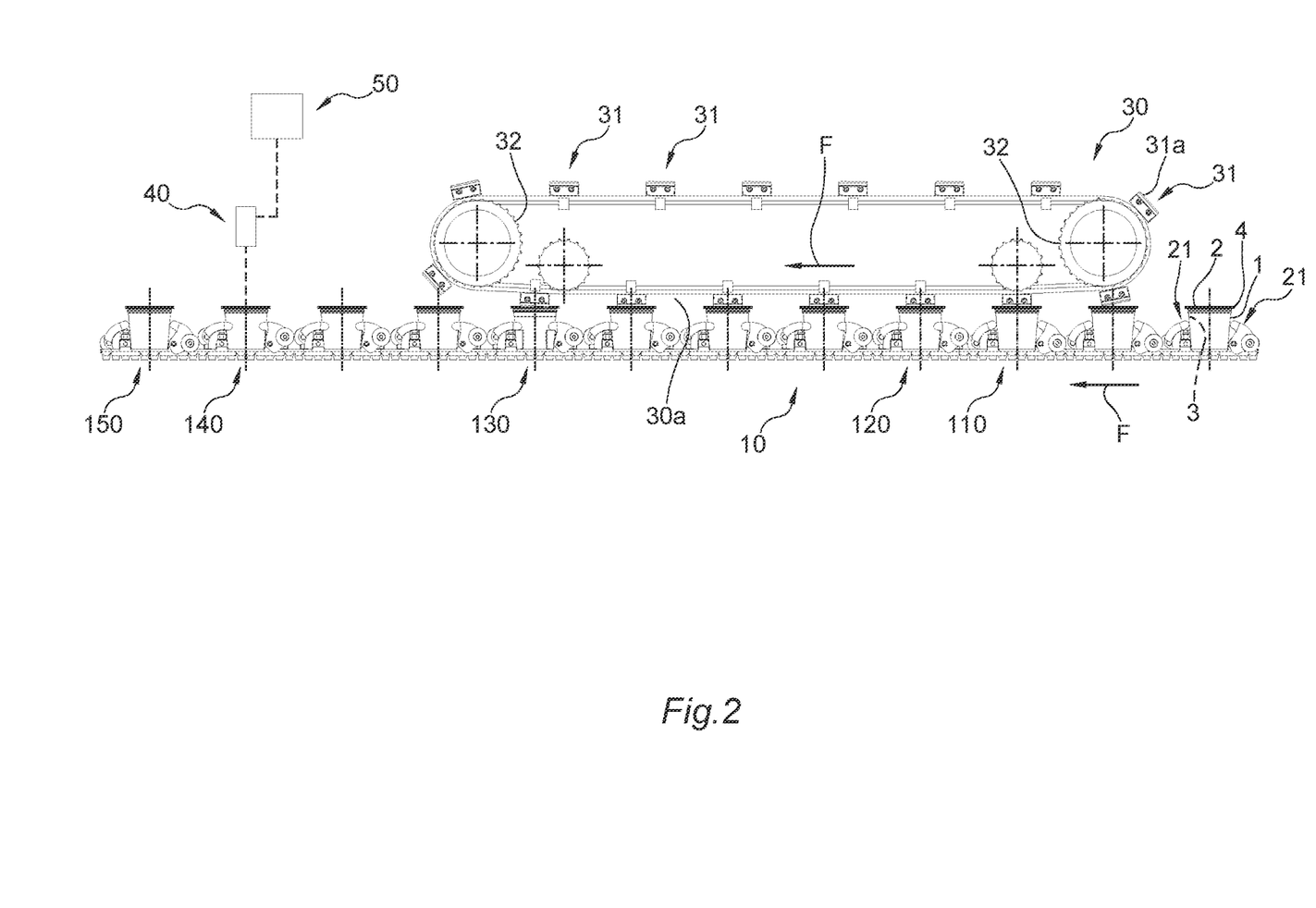
FIG. 2 is a schematic view in side elevation and in partial section of the apparatus of FIG. 1, FIGS. 3 and 4 are schematic partial and enlarged scale views of a detail of the apparatus of the previous figures.

With initial reference to FIGS. 1 and 2, 100 overall indicates an apparatus for testing the tightness of containers 1 closed by a membrane 2, made in accordance with the present disclosure.

The containers 1, in this preferred embodiment, are configured to make capsules for brewing products, for example coffee powder, and are made for the purpose in the form of a conical-truncated glass having a cavity with a larger portion upwards where an opening 3 communicating with the cavity of the container 1 is provided. The loose product is introduced through the opening 3.

The container 1 is provided with an edge 4 delimiting the opening 3, made in the form of an annular crown, on which the closing membrane 2 is fixed, for example by gluing or welding or by means of an operation that includes both.

The fixing of the membrane 2 is made to obtain an airtight closure of the container in order to allow the content of the capsule, and the inert protective atmosphere that may be inserted inside it, to remain permanently separated from the external atmosphere, preferably until the step of using the capsule.

The apparatus 100 comprises a transport device 10, shaped as a conveyor belt and configured to handle a plurality of containers 1, along a transport direction F, from an inlet zone in which they are placed on the conveyor belt by a feeding device (not depicted) up to an outlet zone, in which the containers 1, having completed the step of testing the tightness, are picked up and taken to the subsequent processing steps of the capsule production cycle.

In this preferred example, the containers 1 are handled by the transport device 10 in two side-by-side rows, each row comprising a plurality of containers 1 aligned at a regular pitch along the transport direction F, in this example it is straight. The containers 1 are transported with their respective bottom, placed on the part vertically opposite to the membrane 2, resting on the transport device 10.

The apparatus 100 also comprises a deforming device 20, configured to exert a deforming action on the respective container 1 of the plurality of containers, which is suitable for testing the tightness.

Said deforming device 20 is mounted on the transport device 10 and comprises a plurality of pairs of pressing elements 21, between which the respective container 1 remains positioned during its handling on the transport device 10.

The pressing elements 21 of each pair are mounted in an articulated manner on respective supports 22 integral with a transport plane of the transport device 10. By means of the articulated mounting around a respective axis of oscillation, directed perpendicularly to the transport direction F, each pressing element 21 is oscillatable from and to an operating position in which it is shifted to exert a deforming action by localised squeezing of the container 1. More in particular, each container 1 is submitted to a squeezing action comprising two squeezing actions performed by the respective pressing elements 21, substantially simultaneously, on diametrically opposite sides of the container 1.

For controlling the oscillation movement of the pressing elements 21, a control device 25 comprising a cam mechanism including a cam-follower element 26 coupled with a cam profile 27 is provided.

In greater detail, the cam-follower element 26 is made with a respective roller rotatably supported on the corresponding pressing element 21, around a rotation axis directed perpendicularly to the transport direction F, and the cam profile 27 is defined on a track extended along a longitudinal extension direction of the transport device 10 (parallel to the transport direction F), against which the cam-follower roller is superficially coupled. In this way, by means of the appropriate conformation of the cam profile 27, for example including parallel sections inclined with respect to the transport direction F, the cam-follower roller is shifted transversely with respect to the transport direction F, such movement generating, by providing a suitable lever arm between the articulation axes of the roller and of the pressing element 21, the oscillation of the pressing element 21 from and towards the operating position during the handling of the container 1 in the transport direction F.

Figure 3:
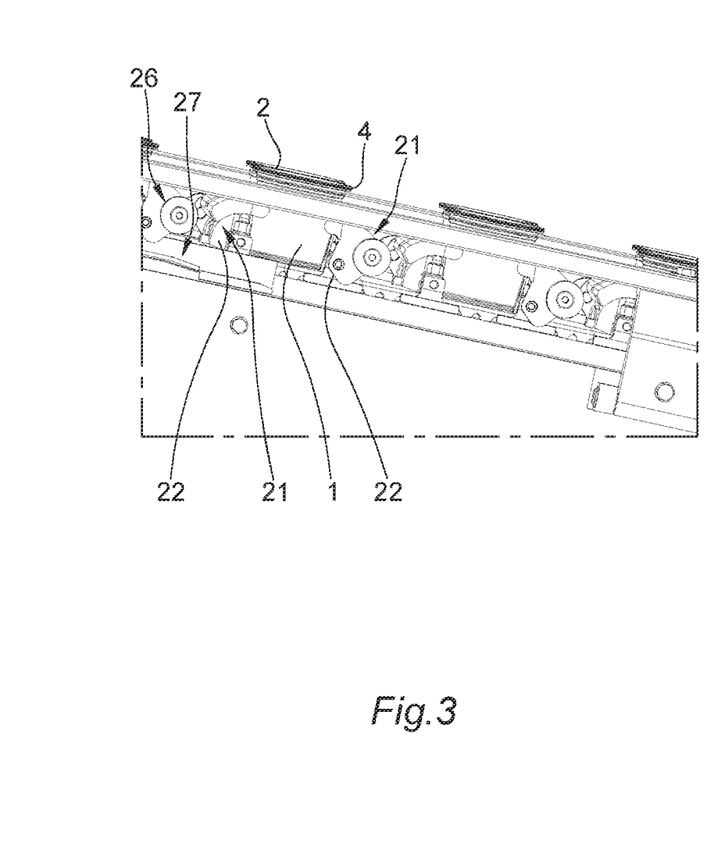
Figure 4:
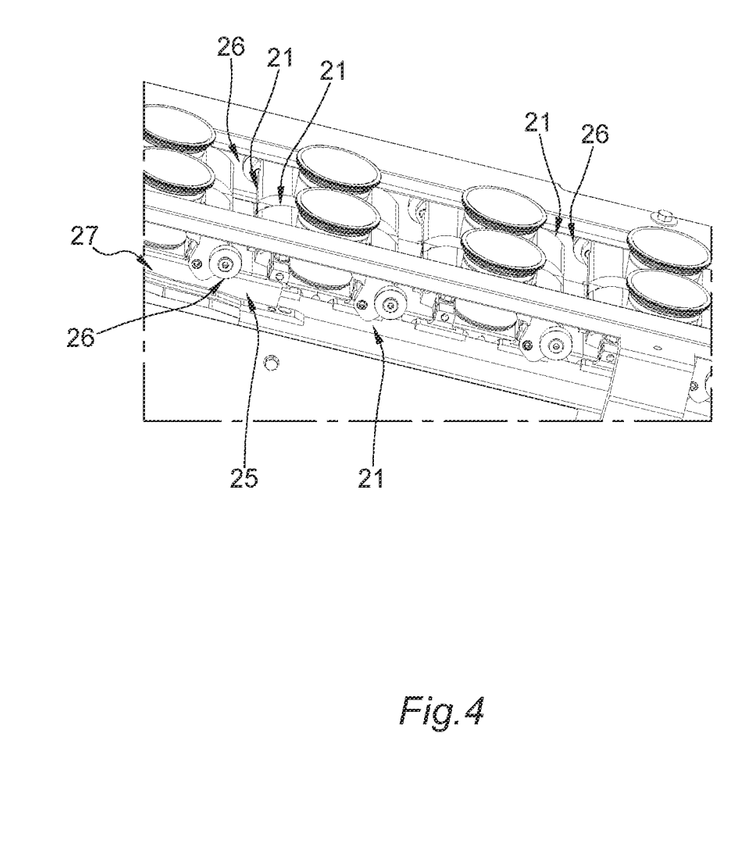

With reference to FIG. 3, since in this preferred example the handling of two side-by-side rows of containers 1 is provided, the control of the pressing elements 21 is made in a constructively and functionally effective manner in the following manner.

Each pair of containers 1 comprises a first container and a second container which move side by side along the transport direction F and is submitted to the deforming action of a first pair of pressing elements 21 and a second pair of pressing elements 21.

The first pair of pressing elements 21 acts on the first container and the second pair of pressing elements 21 acts on the second container. The pressing element of the first pair of pressing elements 21 and the pressing element of the second pair of pressing elements 21, positioned on a same side of the pair of containers 1, so as to be mutually side by side, are oscillatable integrally with each other around a common axis of oscillation and the control of this oscillation takes place by means of a cam-follower roller 26 coupled to a track of the cam profile 27 positioned on one side of the transport device 10.

Similarly, the other pressing element 21 of the first pair of pressing elements 21 and the other pressing element 21 of the second pair of pressing elements 21, also mutually side by side, are oscillatable integrally with each other around a corresponding common axis of oscillation and the control of this oscillation takes place by means of a corresponding cam-follower roller 26 coupled to a second track of the cam profile 27 positioned on an opposite side of the transport device 10.

In other words, on this opposite side of the transport device 10 the second track of the cam profile 27, on which the corresponding cam-follower roller is coupled, is arranged specularly.

It should be observed that based on this configuration, each pair of pressing elements 21 is configured to act on a single container 1.

Furthermore, each pair of containers 1 moving side by side along the direction F is submitted to the action of a squeezing device, the control of which, made by means of the cam mechanism, is common to each other.

The apparatus 100 further comprises a device 30 for handling a plurality of abutting elements 31, each of which is configured to exert an action of abutting the membrane 2 of the corresponding container 1, counteracting the deformation of the membrane 2 caused by the deforming action by squeezing exerted by the pressing elements 21.

The handling device 30 is placed in a position overlying the transport device 10 and is configured as a closed loop belt between a pair of return wheels 32 on which the abutting elements 31 are mounted, aligned with regular pitch, in a movement direction parallel to the direction F. In the handling device 30 an active branch 30a is identified, between the return wheels, which is turned in a position facing the containers 1, with a predetermined spacing so that the abutting elements 31 can exert the action of abutting the membrane 2 in their transit along the active branch 30a.

The handling device 30 is driven with a movement synchronized to the transport device 10, so that each abutting element 31, along the active branch 30a, can exert and maintain the abutting action against the membrane 2 of a respective container 1, during the handling of the latter.

Each abutting element 31 has a perforated or microperforated structure, made with suitable through holes (not represented) configured to be positioned at the membrane 2 of the container during the action of butting the membrane.

Furthermore, each abutting element 31 has a surface 31a intended to abut by contact the membrane 2, having a surface amplitude less than a surface amplitude of the membrane 2 and in any case such as not to come into contact with the membrane at the edge 4 of fixing to the container.

In this preferred example, the abutting element 31 is shaped as a cylindrical body, arranged to be fixed, at a base thereof, to the handling device 30, so as to present the opposite base in abutment with the membrane 2, in particular with a centred positioning with respect to the membrane 2.

Downstream of the handling device 30, with respect to the transport direction F, the apparatus comprises a detection unit 40 configured to detect at least one parameter related to the membrane 2 profile when the action of abutting said abutting element 31 has ceased and according to operating modes described in greater detail below. Conveniently, the detection unit 40 comprises at least one optical detection device 41 for contactlessly measuring the membrane 2.

An example of optical detection device may comprise a photoelectric sensor, in particular a laser sensor of the analogue type.

The optical detection device 41 is arranged to detect, during the transit of the container 1, points of the membrane 2 profile with a predetermined sampling frequency of the readings performed. It is also provided that a respective photoelectric sensor is provided for each row of containers 1.

In another embodiment, it may be provided that the optical detection device 41 comprises a video camera or a camera configured to detect the membrane 2 profile through the analysis of images acquired by the optical detection device 41.

The apparatus 100 further comprises a control unit 50, schematically represented in FIG. 2, configured to compare the parameter related to the membrane 2 profile with a predefined threshold, to verify whether the tightness of the container 1 is to be classified as defective.

With reference to FIG. 2, the method with which the apparatus 100 operates, for testing the tightness of the containers 1 closed by the respective membranes 2, provides for the succession of the following operating steps, performed while the plurality of the containers 1 is driven along the handling path in the transport direction F.

For simplicity of presentation, the method is described below with reference to one of the containers 1 of the plurality of containers, it being understood, however, that the entire plurality of containers is submitted to the steps of the method.

The method envisages submitting the container 1 to the deforming action by means of the pressing elements 21 and submitting the corresponding membrane 2 to the abutting action, by means of a respective abutting element 31, adapted to counteract the deformation of the membrane 2 caused by the deforming action, as well as maintaining the action of abutting the membrane 2 at the same time as the action of deforming the container 1 for a set period of time, indicated with T.

It should be observed that, with reference to a tightly closed container, thanks to the simultaneous action of deforming the container 1 and of abutting the membrane 2, the pressure inside the container 1 can be increased up to a pressure level greater than the pressure level that would be reached through the application of the action of deforming the container 1 alone.

In FIG. 2, by 110 is marked the position, identified in the handling path of the container 1, in which the action of abutting the abutting element 31 against the membrane 2 of the underlying container starts. This abutting action, in which the abutting element 31 is provided so to be able to be positioned substantially flush with the edge 4 of the container 1 while remaining at a minimum distance from the membrane 2 or slightly resting thereon without, however, inducing appreciable compression, is performed before the instant in which the action of deforming the container 1 by the pressing elements 21 starts.

In FIG. 2, 120 indicates the position in which the action of deforming the container 1 by squeezing starts. From this position, the simultaneous action of abutting the membrane 2 and of deforming the container 1 are maintained for the duration of the period T, at the end of which the action of abutting the membrane 2 is interrupted. In FIG. 2, 130 indicates the position in which the abutting action is released.

In an embodiment variant it can be provided that the application of the action of deforming the container 1 is before with respect to the application of the action of abutting the membrane 2. In this case, referring to a tightly closed container, thanks to the action of deforming the container 1 the pressure inside the container 1 is increased up to a first pressure level, and subsequently, thanks to the application of the action of abutting the membrane 2, the pressure inside the container 1 is increased up to at least a second pressure level greater than the first pressure level.

In the preferred example described here, it is provided that the detection of the parameter related to the membrane 2 profile is performed, after the period of time T, once the abutting action has ceased, while the container 1 is still submitted to the deforming action.

In FIG. 2, by 140 is marked the position in which the detection of the parameter related to the membrane 2 profile takes place.

In a subsequent position, indicated with 150, the deforming action exerted by the deforming device 20 has ceased.

In another embodiment, it can be provided that the detection of the parameter related to the membrane 2 profile is performed after the deforming action has ceased. The release of the deforming action takes place in this case in a position comprised between the positions 130 and 140.

It should be observed that the duration of the period of time T and the possible advance, with respect to the period T, with which the abutting action is applied, can be adjusted according to the size of the defect to be detected.

In the control unit 50, the comparison analysis is carried out between the parameter related to the membrane 2 profile with a predefined threshold to verify whether the tightness of the container 1 is to be classified as defective.

By means of the detection unit 40, the parameter related to the membrane 2 profile is determined by detecting the position of a set of points of the membrane 2 profile with respect to a reference plane, to which points of the membrane 2 profile located at the edge 4 of the container 1 to which the membrane 2 is fixed belong.

More particularly, the aforesaid set of detected points comprises a first and a second end point R1, R2 located at the edge 4, respectively on diametrically opposite parts of the membrane 2. The first and second end points R1 and R2 identify in this way a reference line L belonging to the reference plane, and the position of the points of the profile belonging to said set of points is detected with respect to the reference line L. In this way a normalization of the positions of the points detected with respect to the reference line L is obtained.

In this preferred example, the set of detected points of the membrane profile comprised between the end points R1 and R2 is traced by means of a sampling of readings performed by the optical detection device 41, wherein the number of readings is a function of the sizes of the membrane 2 and of the advancement speed of the container 1 in its translation in the transport direction F.

Once the sampling of the position of the points of the membrane 2 profile with respect to the reference line L has been completed, an evaluation criterion for the classification of the membrane profile is applied by the control unit 50. Some examples of applicable criteria are described below and may be applied alternatively or in combination with each other.

Figure 5:
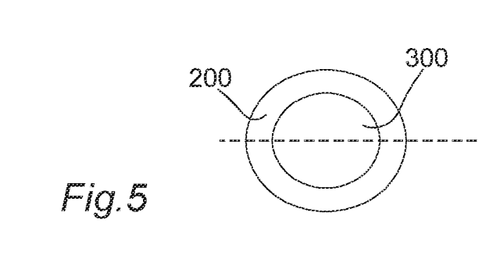
FIGS. 5 and 6 are schematic views, respectively in plan and in side elevation, of a container associated with an example of membrane profile analysed with a first tightness classification mode according to the disclosure.
Figure 6:
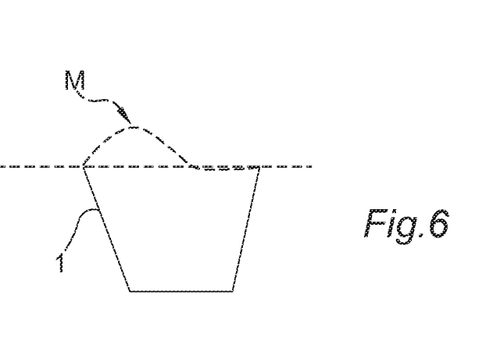

A first criterion is based on the comparison of average values. In greater detail, with reference to FIGS. 5 and 6, the points of the membrane profile, indicated with M, are detected along a diametrical line, identified in the figures by the dashed line. A circular crown sector, indicated with 200, extended starting from the edge zone of the container, which surrounds a circular area 300, is identified on the container 1. A first average value is calculated among the values detected, within the circular crown sector 200, near the edge zones, arranged diametrically opposite. A second average value is calculated among the values detected within the circular area 300 and sampled along a projection of the reference line L. A tightness integrity check is, for example, judged fulfilled if the second average value is greater than or equal to the first average value. The first and second average values are herein intended as derived by the measurement of the distance of the respective points of the membrane from a hypothetical rest plane or from the reference plane of the container and therefore a "greater value" corresponds to a smaller distance from the optical detection device 41.

Figure 7:
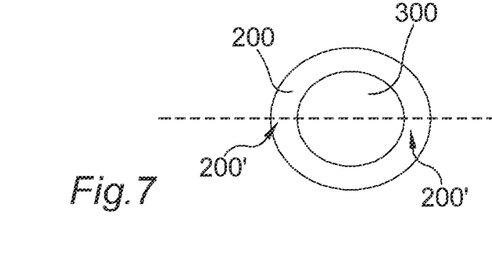
FIGS. 7 and 8 are schematic views, respectively in plan and in side elevation, of a container associated with an example of membrane profile analysed with a second tightness classification mode according to the disclosure.
Figure 8:
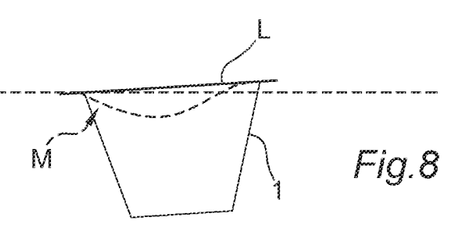
Figure 9:
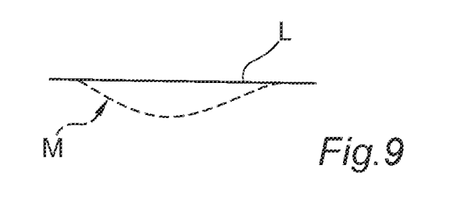
FIG. 9 is a schematic view of the membrane profile of FIG. 8 in a normalized condition with respect to a reference plane.

With reference to FIGS. 7 and 8, a second evaluation criterion is based on the tracing of a threshold line S and on the analysis of how many detected values are positioned above or below the threshold line S. In this example the threshold line S coincides with the reference line L. Assuming that the circular crown sector 200 extends at the edge 4 and therein a first and a second set of detected points are identified, arranged on diametrically opposite parts, the position of which is indicated by the respective references 200' and 200" in FIG. 7, the reference line L is identified as a straight line passing through the central point of the set 200' and through the central point of the set 200". This straight line therefore defines the threshold line S, and the normalization of the readings with respect to said line, the graph of which is shown in FIG. 9, allows an analysis of the membrane profile M independently of the actual position of the container 1 with respect to the optical detection device

41. In this case, the analysis provides for evaluating how many normalized readings of the set of points detected within the circular area 300 are below the threshold S. A tightness integrity check is, for example, judged as fulfilled if the amount of normalized readings that are below the threshold S is less than a set percentage defined in the control unit 50.

Figure 10:
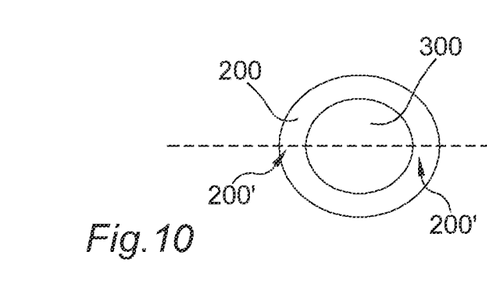
FIGS. 10 and 11 are schematic views, respectively in plan and in side elevation, of a container associated with an example of membrane profile analysed with a third tightness classification mode according to the disclosure.
Figure 11:
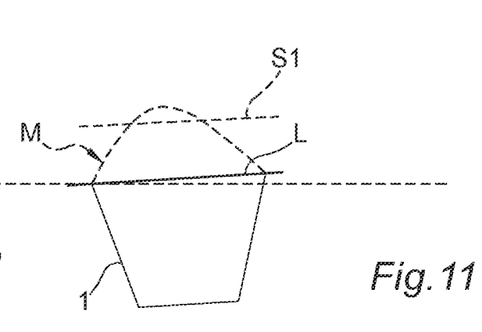
Figure 12:
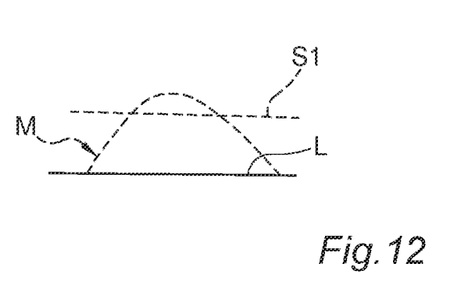
FIG. 12 is a schematic view of the membrane profile of FIG. 11 in a normalized condition with respect to a reference plane.

With reference to FIGS. 10 and 11, a third evaluation criterion differs from the previous one in that it assigns a threshold line 51 extended parallel to and spaced from the reference line L, and provides that it is evaluated how many normalized readings of the set of points detected within the circular area 300 are above the threshold line 51. A tightness integrity check is, for example, judged as fulfilled if the number of normalized readings adjacent to each other and located above the threshold line 51 is higher than a preset percentage defined in the control unit 50.

It should be observed that the method and the apparatus according to the disclosure can also allow to verify the quality of the welding of the membrane 2 with the container 1, i.e. to verify whether folds and wrinkles are present in the membrane 2. In the presence of defects of this type, the graph of the profile of an incorrectly welded membrane, in fact, tends to deviate from the dome shape and generally has one or more hollows, typically having the form of "hoof-like outline". The analysis of the profile makes it possible to recognize such defects, and the recognition is more effective if the optical detection device 41 is configured as a 3D camera.

The invention claimed is:

1. A method for testing tightness of a container closed by a membrane, comprising:
   submitting the container to a deforming action configured to increase pressure inside the container,
   submitting the membrane to an abutting action to counteract deformation of the membrane caused by said deforming action,
   maintaining said abutting action at the same time as said deforming action for a set period of time,
   interrupting said abutting action at the end of said set period of time,
   detecting at least one parameter related to a membrane profile when said abutting action has ceased, and
   comparing said at least one parameter related to said membrane profile with a predefined threshold to verify whether the tightness of said container is to be classified as defective.

2. The method according to claim 1, wherein said deforming action and said abutting action are exerted on the container while said container is driven along a handling path.

3. The method according to claim 1, wherein said abutting action is exerted before said set period of time starts.

4. The method according to claim 1, wherein the detecting the at least one parameter related to the membrane profile is performed while said container is still submitted to said deforming action, after the abutting action has ceased.

5. The method according to claim 1, wherein the deforming action is interrupted after said set period of time and the detecting said at least one parameter related to the membrane profile is performed after the deforming action has ceased.

6. The method according to claim 1, wherein said deforming action comprises at least one localized squeezing of said container.

7. The method according to claim 6, wherein said at least one localized squeezing includes two squeezing actions performed, substantially simultaneously, on diametrically opposite sides of said container.

8. The method according to claim 1, wherein said at least one parameter related to the membrane profile is detected by detecting a position of one or more points of the membrane profile.

9. The method according to claim 1, wherein said at least one parameter related to the membrane profile is detected by contactlessly detecting said membrane.

10. The method according to claim 1, comprising:
    detecting a position of a set of points of the membrane profile with respect to a reference plane, said reference plane being defined by points located at an edge of the container to which the membrane is fixed.

11. The method according to claim 10, wherein said set of points comprises at least a first end point and a second end point located at said edge, said first end point and second end point defining a reference line belonging to said reference plane, the position of the points of said set of points being detected with respect to said reference line.

12. An apparatus for testing tightness of a container closed by a membrane, comprising:
    at least one deforming device configured to exert a deforming action on the container,
    at least one abutting element of the membrane configured to counteract deformation of the membrane caused by the deforming action, said at least one deforming device and said at least one abutting element being arranged to act simultaneously on said container for a set period of time,
    a detection unit configured to detect at least one parameter related to a membrane profile when an abutting action of said abutting element has ceased, and
    a control unit configured to compare said at least one parameter related to said membrane profile with a predefined threshold to verify whether the tightness of said container is to be classified as defective.

13. The apparatus according to claim 12, further comprising a transport device of the container, wherein said at least one deforming device is mounted on the transport device of the container.

14. The apparatus according to claim 13, wherein said at least one deforming device comprises a pair of pressing elements between which the container is configured to be positioned, said pressing elements being mounted in an articulated manner on respective supports to be oscillatable from and to an operating position where said pressing elements exert the deforming action.

15. The apparatus according to claim 14, further comprising a control device for controlling an oscillation movement of each pressing element, said control device comprising a cam mechanism including a cam-follower element rotatably supported on said each pressing element and superficially coupled with a cam profile extended along a longitudinal extension direction of the transport device.

16. The apparatus according to claim 13, wherein the at least one deforming device comprises a plurality of deforming devices mounted on the transport device, configured to transport a plurality of containers, a respective deforming device of said plurality of deforming devices being individually associated with a respective container of said plurality of containers.

17. The apparatus according to claim 13,
    wherein the at least one deforming device comprises a plurality of deforming devices mounted on the transport device, configured to transport a plurality of containers, a respective deforming device of said plurality of deforming devices being individually associated with a respective container of said plurality of containers, and wherein the at least one abutting element comprises a plurality of abutting elements mounted on said handling device, each abutting element of said plurality of abutting elements being individually associated with a respective container of said plurality of containers in exerting the abutting action of abutting a corresponding membrane of the container.

18. The apparatus according to claim 12, wherein said detection unit comprises at least one optical detection device for contactlessly measuring said membrane.

* * * * *